US012323810B2

(12) United States Patent
Rogel et al.

(10) Patent No.: US 12,323,810 B2
(45) Date of Patent: Jun. 3, 2025

(54) RADIO FREQUENCY FINGERPRINTING WITHIN DYNAMIC NETWORK TOPOLOGY

(71) Applicant: LEVL PARENT, LLC., Wilmington, DE (US)

(72) Inventors: Nuriel Rogel, Rehovot (IL); Michael Estrin, Holon (IL); Daniel Zahavi, Rishon Lezion (IL)

(73) Assignee: LEVL PARENT, LLC., Wilmington, DE (US)

( * ) Notice: Subject to any disclaimer, the term of this patent is extended or adjusted under 35 U.S.C. 154(b) by 398 days.

(21) Appl. No.: 18/085,219

(22) Filed: Dec. 20, 2022

(65) Prior Publication Data

US 2023/0199506 A1  Jun. 22, 2023

Related U.S. Application Data

(60) Provisional application No. 63/292,004, filed on Dec. 21, 2021.

(51) Int. Cl.
*H04W 12/79* (2021.01)
*H04W 12/06* (2021.01)

(52) U.S. Cl.
CPC .......... *H04W 12/79* (2021.01); *H04W 12/06* (2013.01)

(58) Field of Classification Search
CPC ..... H04W 12/79; H04W 12/06; H04B 17/336
See application file for complete search history.

(56) References Cited

U.S. PATENT DOCUMENTS

| 2004/0120412 A1 | 6/2004 | Banerjea |
| 2009/0154627 A1 | 6/2009 | Park et al. |
| 2010/0067546 A1 | 3/2010 | Mishra et al. |
| 2010/0254475 A1 | 10/2010 | Kawauchi et al. |

(Continued)

FOREIGN PATENT DOCUMENTS

| CN | 202906963 U | 4/2013 |
| CN | 106961434 A | 7/2017 |
| EP | 2744162 B1 | 6/2015 |

OTHER PUBLICATIONS

Hou, Weikun, Xianbin Wang, and Jean-Yves Chouinard. "Physical layer authentication in OFDM systems based on hypothesis testing of CFO estimates." In 2012 IEEE International Conference on Communications (ICC), pp. 3559-3563. IEEE, 2012. Hou Weikun Jun. 10, 2012 (Jun. 10, 2012).

(Continued)

*Primary Examiner* — Brandon J Miller
(74) *Attorney, Agent, or Firm* — The Roy Gross Law Firm, LLC; Roy Gross (57) ABSTRACT

A computer-implemented method comprising: receiving, by a first radio frequency (RF) receiving device, an RF data transmission from an RF transmitter; analyzing the received RF data transmission to estimate at least one RF feature; constructing, based on the at least one RF feature, an RF fingerprint of the RF transmitter which is specific to the first RF receiving device; and modifying the RF fingerprint to generate a modified RF fingerprint for use by a second RF receiving device, by applying, to the RF fingerprint, a conversion function reflecting a differential between respective contribution values associated with each of the first and second receiving devices.

20 Claims, 7 Drawing Sheets

(56) References Cited

U.S. PATENT DOCUMENTS

| | | | |
|---|---|---|---|
| 2010/0311436 A1* | 12/2010 | Bevan | G01S 5/02521 |
| | | | 455/456.1 |
| 2017/0328979 A1 | 11/2017 | Norbert et al. | |
| 2018/0212635 A1 | 7/2018 | Wicaksana et al. | |
| 2020/0036710 A1* | 1/2020 | Khanna | H04W 12/041 |
| 2020/0067616 A1 | 2/2020 | Blokh et al. | |
| 2020/0112464 A1 | 4/2020 | Rogel et al. | |
| 2021/0029500 A1* | 1/2021 | Ye | H04W 4/029 |
| 2021/0048507 A1* | 2/2021 | Kuzdeba | G06N 20/00 |

OTHER PUBLICATIONS

Raboh, Mohamed S. Abd, Hatem M. Zakaria, Abdel Aziz M. Al Bassiouni, and Mahmoud M. El Bahy. "Carrier frequency offset (CFO) estimation methods, A comparative study." (2017). Mohamed S. Abd Raboh Dec. 31, 2017 (Dec. 31, 2017).

Vo-Huu, Tien Dang, Triet Dang Vo-Huu, and Guevara Noubir. "Fingerprinting Wi-Fi devices using software defined radios." In Proceedings of the 9th ACM Conference on Security & Privacy in Wireless and Mobile Networks, pp. 3-14. 2016. Tien D. Vo-Huu Jul. 18, 2016 (Jul. 18, 2016).

Ning Xie et al., "A Survey of Physical-Layer Authentication in Wireless Communications"; IEEE Communications Surveys, vol. 23, Issue 1, pp. 282-310, Dec. 3, 2020, doi: 10.1109/COMST.2020.3042188.

* cited by examiner

RADIO FREQUENCY FINGERPRINTING WITHIN DYNAMIC NETWORK TOPOLOGY

CROSS-REFERENCE TO RELATED APPLICATIONS

This application claims the benefit of priority from U.S. Provisional Patent Application No. 63/292,004, filed on Dec. 21, 2021, entitled "RADIO FREQUENCY FINGERPRINTING WITHIN DYNAMIC NETWORK TOPOLOGY," the contents of which are incorporated by reference herein in their entirety.

FIELD OF THE INVENTION

The invention relates generally to the field of wireless communication systems.

BACKGROUND

The use of wireless communication systems, and their interconnections via networks, has grown rapidly in recent years. With the proliferation of mobile and Internet of Things (IoT) device, wireless technologies are becoming essential parts of modern life which provide low-cost, anywhere connectivity.

Wireless networks share many of the same vulnerabilities as wired networks. However, the broadcast nature of the wireless transmission medium means that wireless communication is even more prone to attacks and disruptions than wired communication. Because wireless RF communication can suffer from these increased threats, additional countermeasures are needed to protect against them.

One promising approach toward thwarting these attacks is through the extraction of unique device-specific "fingerprints" that can provide a reliable and robust means for positive device identification and authentication. Device fingerprints can be extracted from transmitted RF signals, by analyzing information across various layers of the protocol stack.

Because RF fingerprints are difficult to clone, they may be relied on to obtain dependable and efficient electronic fingerprints and signatures from RF devices. These, in turn, may play a significant role in improving the security of many RF transmission protocols, e.g., for identification and authentication purposes. For example, by obtaining and storing the unique fingerprints of RF devices in a network, each device can be positively identified and authenticated within the network, thereby thwarting attempts to infiltrate the network with an unauthorized device attempting to impersonate an authorized device. In another example, RF fingerprints may also help to avoid relay attacks, because a relay device attempting to impersonate a legitimate device will, by necessity, have a slightly different RF fingerprint which may be detected by the transceiver device.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least One hardware processor; and a non-transitory computer-readable storage medium having stored thereon program instructions, the program instructions executable by the at least one hardware processor to: receive, by a first radio frequency (RF) receiving device, an RF data transmission from an RF transmitter, analyze the received RF data transmission to estimate at least one RF feature, construct, based on the at least one RF feature, an RF fingerprint of the RF transmitter which is specific to the first RF receiving device, and modify the RF fingerprint to generate a modified RF fingerprint for use by a second RF receiving device, by applying, to the RF fingerprint, a conversion function reflecting a differential between respective contribution values associated with each of the first and second receiving devices.

There is also provided, in an embodiment, a computer-implemented method comprising: receiving, by a first radio frequency (RF) receiving device, an RF data transmission from an RF transmitter; analyzing the received RF data transmission to estimate at least one RF feature; constructing, based on the at least one RF feature, an RF fingerprint of the RF transmitter which is specific to the first RF receiving device; and modifying the RF fingerprint to generate a modified RF fingerprint for use by a second RF receiving device, by applying, to the RF fingerprint, a conversion function reflecting a differential between respective contribution values associated with each of the first and second receiving devices.

There is further provided, in an embodiment, a computer program product comprising a non-transitory computer-readable storage medium having program instructions embodied therewith, the program instructions executable by at least one hardware processor to: receive, by a first radio frequency (RF) receiving device, an RF data transmission from an RF transmitter; analyze the received RF data transmission to estimate at least one RF feature; construct, based on the at least one RF feature, an RF fingerprint of the RF transmitter which is specific to the first RF receiving device; and modify the RF fingerprint to generate a modified RF fingerprint for use by a second RF receiving device, by applying, to the RF fingerprint, a conversion function reflecting a differential between respective contribution values associated with each of the first and second receiving devices.

In some embodiments, the RF fingerprint is used by the first receiving device, and the modified RF fingerprint is used by the second receiving device, to perform at least one of: identifying the RF transmitter and authenticating a transmission received from the RF transmitter.

In some embodiments, at least one RF feature is a carrier frequency offset (CFO) value associated with the RF transmitter.

In some embodiments, the contribution value associated with the first and second receiving devices represent a change in the RF feature resulting from one or more of: operational parameters, ambient parameters, and hardware parameters, associated with the first or second receiving device, respectively.

In some embodiments, the operational parameters and ambient parameters include at least one of: device operating temperature, connectivity state of one or more transceivers within the device, signal-to-noise ratio, channel bandwidth, a network communication channel used in transmission, ambient temperature, and ambient relative humidity.

In some embodiments, the contribution values are calculated by each of the first and second receiving devices, respectively with respect to one another.

In some embodiments, the contribution values are calculated by a third network device with respect to each of the first and second receiving devices.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a technique, embodied in a system, computer-implemented method, and computer program product, which provides for generating a client-device radiofrequency (RF) fingerprint, which is specific to a particular transceiver node within a communication network. The present technique may then be used to adapt the generated RF fingerprint for global use by any other node within the communication network and/or a different communication network, to identify and authenticate the client device. In some embodiments, the generated RF fingerprint may be used to identify and authenticate the client device by any node within the network and/or any other network, including nodes which have not been in previous communication with the client device.

As noted above, a promising approach toward thwarting attacks and providing reliable device authentication within the context of wireless data communication networks, is through the extraction of unique device-specific RF fingerprints that can provide a reliable and robust means for positive device identification.

In some cases, device fingerprints may be extracted from a transmitted RF data signal by analyzing information across various layers of the protocol stack. Specifically, some device fingerprinting techniques analyze features in the PHY (physical) layer of the various communication protocols. PHY layer features are derived from the received RF waveform, and generally include location-dependent features and location-independent features. Location-dependent features include received signal strength (RSS), which measures the average signal power at the receiver, which is a function of on the transmission power at the sender and the attenuation in the channel. RSS is typically reported as a single number (e.g., in dB and dBm) by wireless device drivers. Two identical device in different locations can have very different RSS values with respect to the same transmitter, whereas if two devices are in close proximity, their RSS values tend to be similar. Another location-dependent feature is the channel state information at the receiver (CSIR). Due to small-scale fading, CSIR can differ a lot when a receiver moves by only a fraction of the wavelength.

Location-independent features relate to the hardware implementation of individual device chipsets. Despite significant advancement in micro-electronic circuit design and manufacturing, there are still imperfections in the manufacture process of wireless transmitters. Such imperfections result in broad variations in key device parameters (e.g. channel width, channel doping, concentration, and oxide thickness) among production lots. These variations, though small enough to meet the specifications of communication standards and certification requirements, allow for unique characterization of the devices by forming device fingerprints. For example, such variations may manifest in the transient portion of RF signals as slight variations in amplitude, phase angle and frequency. Another example is power amplifier imperfections; because power amplifiers are the last elements in the RF chain of transmitters, it is especially hard for attackers to modify via software.

RF signal analysis may use waveform domain techniques, which analyze time and frequency representation of the received signal, or modulation domain techniques which represent signals in terms of I/Q samples. For example, carrier frequency difference (CFD) or carrier frequency offset (CFO), as well as phase shift difference (PSD), may be used to fingerprint wireless devices. CFD and CFO represent the difference between the carrier frequency of the ideal signal and the one of the transmitted signal, which is likely to be different for different wireless transmitters. PSD is defined as the phase shift from one constellation to a neighboring one, which may vary because of the difference between the transmitter amplifier for I-phase and Q-phase.

However, although RF fingerprinting based on location-independent PHY layer features is an established technique, the resulting fingerprints often reflect a contribution value to signal by the specific transceiver device used for taking signal measurements. Thus, RF fingerprints may end up being transceiver-specific, and may not be readily transferable for deployment by other transceivers, even within the same communication network. Rather, their use may be limited to the particular transceiver used for taking signal measurements and extracting the PHY features.

This may present a challenge in various situations, where a device (such as a mobile device) may dynamically connect through multiple nodes within a communication network. In a non-limiting example, in the context of mesh networks, client devices may connect directly, dynamically, and non-hierarchically, to any number of network nodes making up the network topology, wherein the nodes all cooperate with one another to route data from/to the client. Mesh topologies allow for every node to participate in the relay of information, and for the network to dynamically self-organize and self-configure, and thus enable dynamic distribution of workloads, particularly in the event that one or more nodes fail. However, the dynamic nature of mesh networks means that, at any given moment, a client device may connect through a different node, and thus may require a host of different RF fingerprints to work with every node in the network.

However, many other network topologies present similar issues, e.g., any local area network (LAN) that interconnects computers within a defined area, such as a residence, school, business enterprise, office building university campus, or even a 'smart' city network. LANs may include numerous network nodes, such as access points (AP), routers, repeaters, hubs, bridges, switches, etc. A client device may thus connect to the LAN from any one of the network nodes, and thus every node may need to generate a unique fingerprint for each client device within the network, which may be burdensome to manage and raise connectivity delays.

Accordingly, the present disclosure provides for generating an RF fingerprint for a client device at a first node of a data communication network, wherein the generated RF fingerprint may be adapted for global use by any other node within the communication network, to identify and authenticate the client device, without the need to generate a plurality of node-specific RF fingerprints for each and every network transceiver.

A potential advantage of the present disclosure is, therefore, in that it provides for a quick and cost-effective way to generate global RF fingerprints for client devices within a communication network, to allow for efficient and practical implementation of RF fingerprinting technology on a large scale.

The term 'RF' is used herein broadly, to include all signals transmitted as free-space electromagnetic radiation or emission in all frequency bands used in communications, according to a wide variety of RF data communication protocols. In some embodiments, the present invention may be applied with respect to one or more local area networks and/or personal area network protocols, including, but not limited to, Wi-Fi, Bluetooth, Bluetooth Low Energy (BLE), and/or ZigBee.

The term 'RF fingerprint' as used herein refers to one or more RF traits, characteristics, and/or features extracted from an RF signal transmitted by a device, which are unique to the transmitting device. These traits and characteristics may be extracted by analyzing the RF signal and/or information from one or more layers of the transmission protocol stack. These RF features are device-specific, even among devices of the same make and model, and manifest themselves as artifacts of emitted signals. In some cases, these RF traits, characteristics, and/or features may be sufficiently unique, either individually or in combination of two or more, so as to form a radiometric identity of the transmitting device.

Figure 1A:
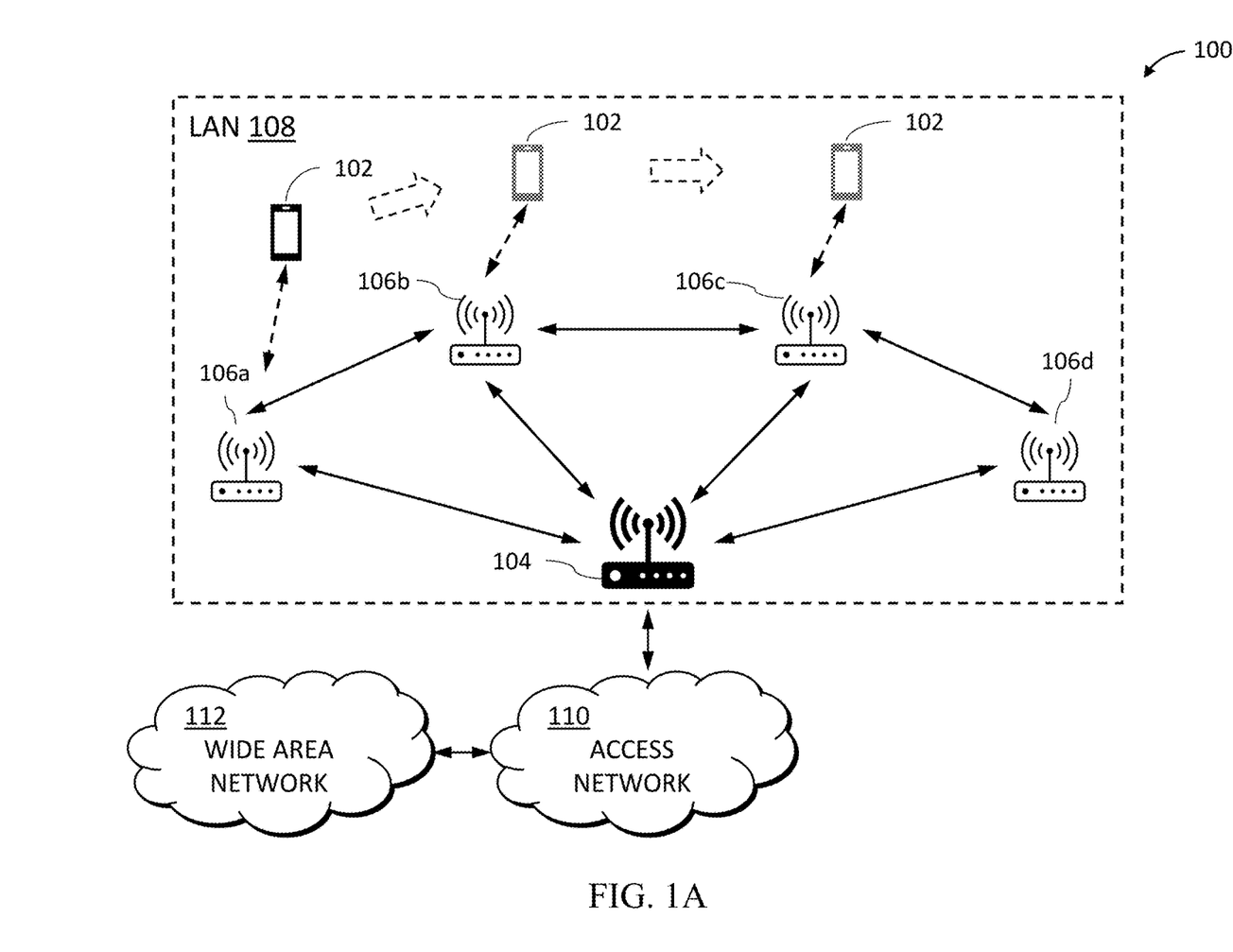
FIGS. 1A-1B illustrate exemplary network environments which may provide for generating a client-device radiofrequency (RF) fingerprint in conjunction with a transceiver node within a communication network, wherein the generated RF fingerprint may then be adapted for global use by any other node within the communication network, to identify and authenticate the client device, according to some embodiments of the present disclosure.
Figure 1B:
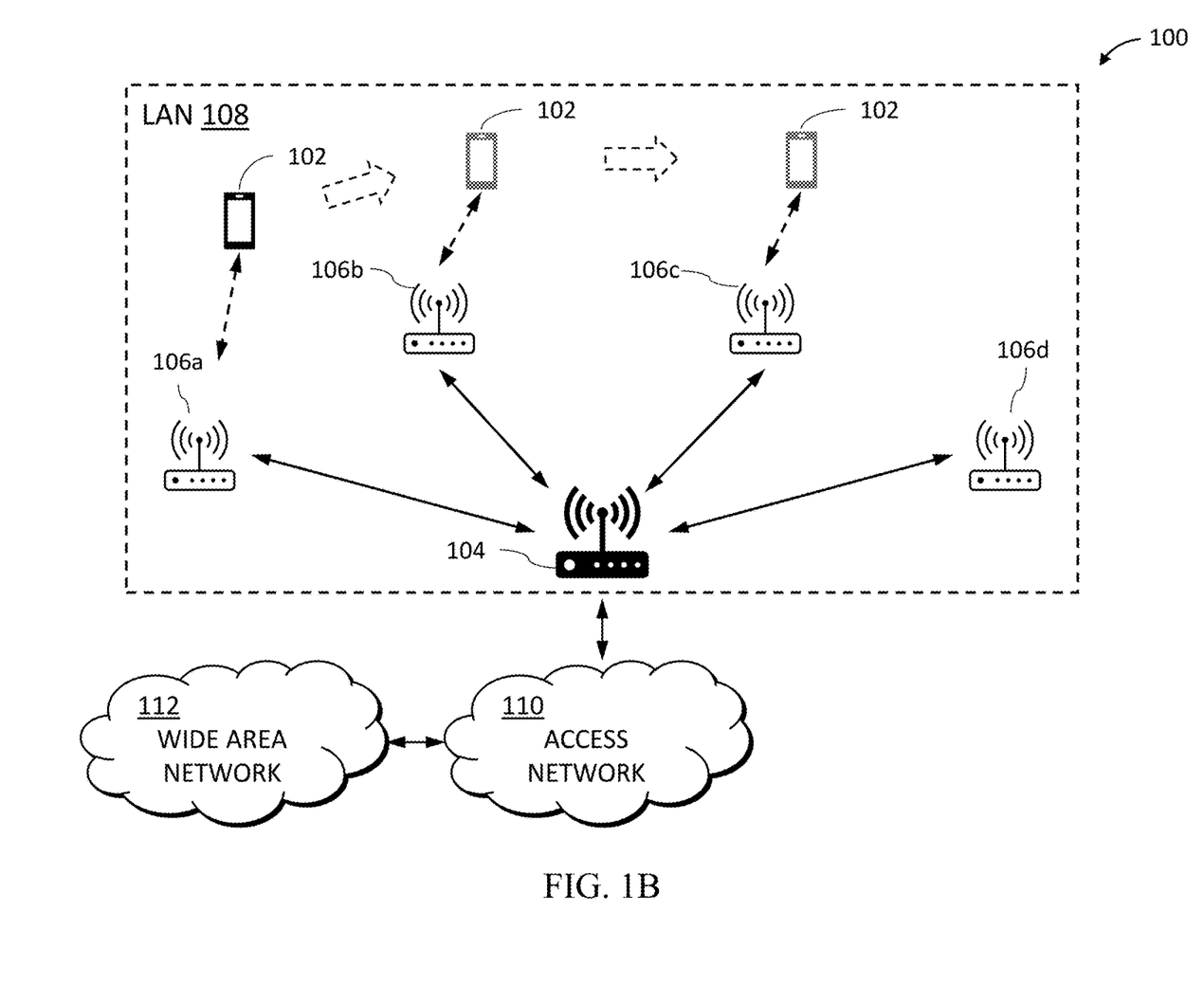

Reference is made to FIGS. 1A-1B, which illustrate two possible topologies of an exemplary data communication network environment 100 which may provide for generating a client-device radiofrequency (RF) fingerprint in conjunction with a transceiver node within the communication network, wherein the generated RF fingerprint may then be adapted for global use by any other node within the communication network, to identify and authenticate the client device, according to some embodiments of the present disclosure.

Network environment 100 is presented for exemplary purposes only, and in practice may include more of fewer network nodes of various kinds. The term 'network' as used herein refers broadly to any arrangement providing for wireless data communication between two or more computing devices located on or provided by network nodes. Computer networks of the present disclosure may encompass different network sizes, topologies, traffic control mechanisms, and organizational intent. Networks of the present disclosure may employ any suitable communication protocols over digital interconnections to permit nodes to communicate with each other. These interconnections may be based on physically wired, optical, and wireless radio-frequency methods that may be arranged in a variety of network topologies. The nodes of a computer network of the present disclosure may include personal computers, servers, networking hardware, or other specialized or general-purpose hosts.

As shown in FIGS. 1A-1B, arrows may represent a one- or two-way flow of wireless data among the various constituent elements of exemplary network environment 100.

As can be seen in FIG. 1A, network environment 100 may include a LAN 108 representing a fully-connected network topology wherein all or at least a portion of the network nodes are able to communicate directly with one another. FIG. 1B represents a star topology of LAN 108 within network environment 100, wherein network nodes (e.g., 106a-106d) are connected to a central hub (e.g., AP 104). In some embodiments, additional and/or other network topologies may be implemented, such as ring, bus, and/or mesh.

Data communication network environment 100 includes a client device (STA) 102 communicably connected to the internet through a LAN 108, access network 110 and wide area network 112. LAN 108 includes access point (AP) 104 and a plurality of network nodes (e.g., routers repeaters, bridges, switches) 106a-106d, and STA 102. LAN 108 may be connected with the access network via a broadband modem.

STA 102 can represent various forms of computing devices, e.g., a desktop computer, a laptop computer, a handheld computer, a tablet, a cellular telephone, a smartphone, a network appliance, a camera, a media player, a navigation device, a gaming console, or a combination of any these devices.

In some aspects, STA 102 may communicate data through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, for example, using a Bluetooth, Wi-Fi, or other such transceiver.

Wide area network 112 can include, but is not limited to, a large computer network that covers a broad area (e.g., across metropolitan, regional, national or international boundaries), for example, the internet, a private network, an enterprise network, a cellular network, or a combination thereof connecting any number of mobile clients, fixed clients, and servers. Further, wide area network 112 can include, but is not limited to, any of the following network topologies, including a bus network, a star network, a ring network, a mesh network, a star-bus network, tree or hierarchical network, and the like. Wide area network 112 may include one or more wired or wireless network devices that facilitate device communications between STA 102 and the internet, such as switch devices, router devices, relay devices, etc., and/or may include one or more servers.

Access network 110 can include, but is not limited to, a cable access network, public switched telephone network, and/or fiber optics network to connect wide area network 112 to LAN 108. Access network 110 may provide last mile access to the internet. Access network 110 may include one or more routers, switches, splitters, combiners, termination systems, central offices for providing broadband services.

LAN 108 can include, but is not limited to, a computer network that covers a limited geographic area (e.g., a home, school, computer laboratory, a business enterprise, or an office building) using a wired or wireless distribution method. Client devices (e.g., STA 102) may associate with AP 104 or any network node 106a-106d to access LAN 108 using any suitable communication protocol, e.g., Wi-Fi.

For exemplary purposes, LAN 108 is illustrated as including one STA 102; however, LAN 108 may include any number of STAs, e.g., two or more. In some implementations, LAN 108 may be, or may include, one or more of a bus network, a star network, a ring network, a relay network, a mesh network, a star-bus network, a tree or hierarchical network, and the like.

AP 104 can include a network-connectable device, such as a hub, a router, a switch, a bridge, or an AP. The network-connectable device may also be a combination of devices, such as a Wi-Fi router that can include a combination of a router, a switch, and an AP. Other network-connectable devices can also be utilized in implementations of the subject technology. AP 104 can allow client devices (e.g., STA 102) to connect to wide area network 112 via access network 110. Similarly, each of network nodes 106a-106d can include a network-connectable device, such as a hub, a router, a switch, or a bridge. Network nodes 106a-106d may also be a combination of devices, such as a Wi-Fi router that can include a combination of a router, a switch, etc.

As can be seen in FIGS. 1A-1B, STA 102 may roam about the geographic area covered by LAN 108 (e.g., an employee carrying STA 102 visiting different floors of an office building, or a student walking to a different area of a building within a university campus), and in doing so, may dynamically connect and disconnect from one or more of network nodes 106a-106d, as may be necessary to allow for continuous data connection between STA 102 and LAN 108. Thus, in order to authenticate STA 102, each of AP 104 and network nodes 106a-106d may need to store an RF fingerprint of STA 102 and apply it for authentication purposes.

As noted above, typically, the RF fingerprints stored by each network node 106a-106d are node-specific, such that each node may need to store its own version of the RF fingerprint of STA 102.

Accordingly, the present disclosure provides for generating an RF fingerprint for STA 102 at a first node (e.g., 106a) of LAN 108, wherein the generated RF fingerprint may then be adapted for global use by any other of nodes 106b-106d within LAN 108, to identify and authenticate STA 102, without the need to generate a plurality of node-specific RF fingerprints for each and every one of nodes 106a-106d.

Figure 2:
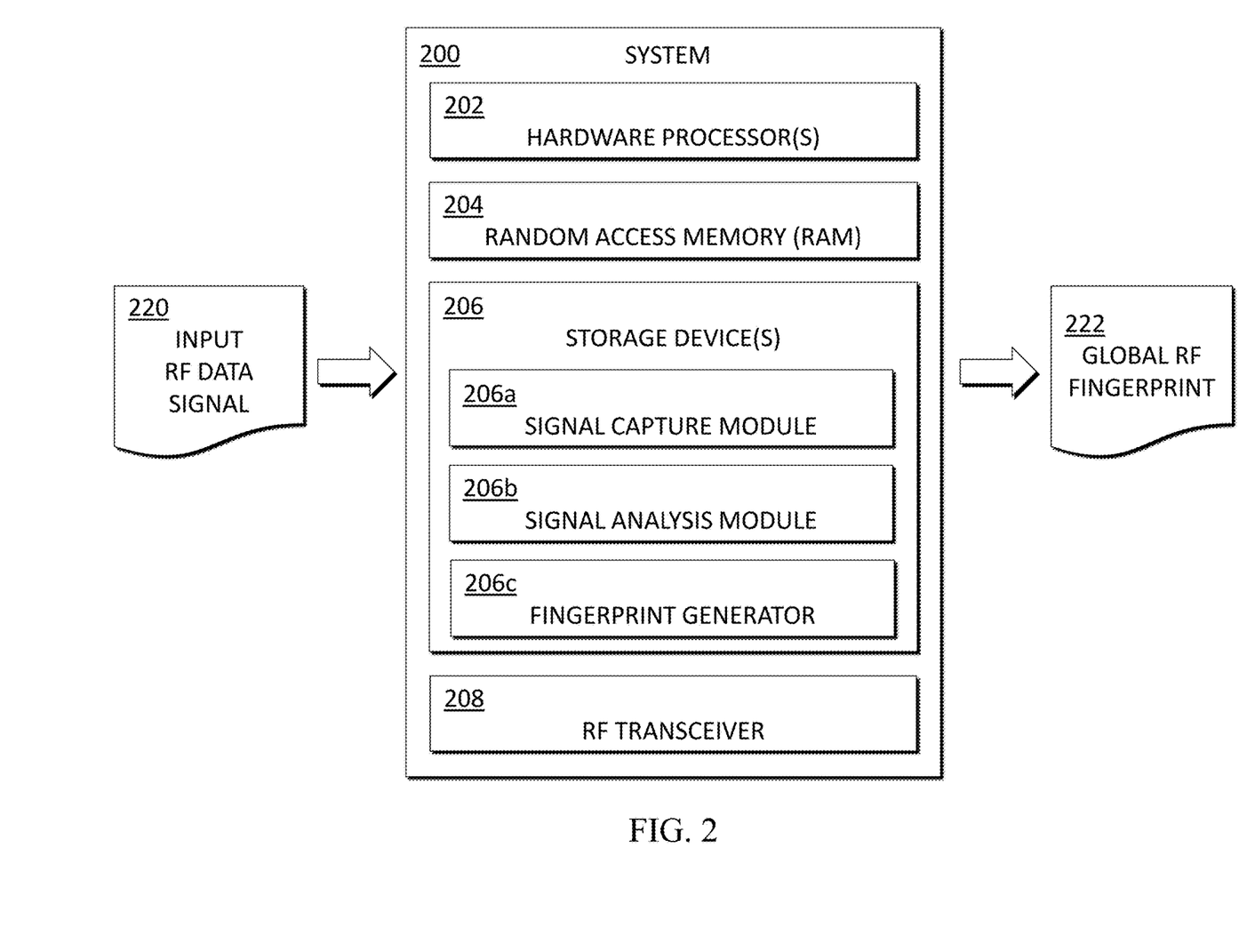
FIG. 2 shows a block diagram of an exemplary system for generating a client-device radiofrequency (RF) fingerprint in conjunction with a transceiver node within a communication network, wherein the generated RF fingerprint may then be adapted for global use by any other node within the communication network, to identify and authenticate the client device, according to some embodiments of the present disclosure.

FIG. 2 shows a block diagram of an exemplary system 200 for generating a client-device radiofrequency (RF) fingerprint in conjunction with a transceiver node within a communication network, such as LAN 108 shown in FIGS. 1A-1B, wherein the generated RF fingerprint may then be adapted for global use by any other node within the communication network, to identify and authenticate the client device, according to some embodiments of the present disclosure.

System 200 as described herein is only an exemplary embodiment of the present invention, and in practice may have more or fewer components than shown, may combine two or more of the components, or a may have a different configuration or arrangement of the components. The various components of system 200 may be implemented in hardware, software or a combination of both hardware and software.

In various embodiments, system 200 may comprise a dedicated hardware device, or may be implement as a hardware and/or software module into an existing device. In some embodiments, system 200 may be implemented and installed within any network device or node used to authenticate one or more devices as they communicate. For instance, system 200 can be implemented and installed as a wireless access point or a cellular base station. The communication network or networks can include any wireless communication network such as LAN 108 shown in FIGS. 1A-1B, a mobile data network, a cellular voice and data network, a wireless local area network (e.g., Wi-Fi or an 802.xx network), a personal area network, or any other wireless network. The communication devices can include any network edge device, bridge device or home gateway, a mobile communication device, laptop computer, tablet, smartphone, smart watch, or any other communication device. In some embodiments, as noted above, system 200 may be implemented as software instructions embedded and being executed on one or more devices within a network, wherein each system 200 device may comprise any network device or node. In such cases, the computational tasks of system 200 may be shared by one or more of the system 200 devices, so as to divide overall computational load. In other cases, system 200 may share computational tasks with a public or private cloud platform.

System 200 may include one or more hardware processor(s) 202, a random-access memory (RAM) 204, one or more non-transitory computer-readable storage device(s) 206, and an RF transceiver 208 configured for handling both transmitted and received RF signals. Components of system 200 may be co-located or distributed, or the system may be configured to run as one or more cloud computing 'instances,' 'containers,' 'virtual machines,' or other types of encapsulated software applications, as known in the art. As one example, system 200 may in fact be realized by two separate but similar systems. These two systems may cooperate, such as by transmitting data from one system to the other (over a local area network, a wide area network, etc.), so as to use the output of one module as input to the other module.

Storage device(s) 206 may have stored thereon program instructions and/or components configured to operate hardware processor(s) 202. The program instructions may include one or more software modules, such as signal capture module 206a, data analysis module 206b, and/or fingerprint generator 206c. The software components may include an operating system having various software components and/or drivers for controlling and managing general system tasks (e.g., memory management, storage device control, power management, etc.), and facilitating communication between various hardware and software components. System 200 may operate by loading instructions of the various software modules 206a-206c into RAM 204 as they are being executed by processor(s) 202.

RF transceiver 208 may be configured to receive as input network RF data signal 220, in the form of an RF signal according to any suitable RF data communication protocol, which may be emitted from a specified client device within a communication network, e.g., STA 102. RF transceiver 208 may then be configured to transmit the received RF signal to other modules within system 200, e.g., signal capture module 206a and/or to other components of system 200.

In some embodiments, signal capture module 206a may be configured to receive the RF data signal 220 from RF transceiver 208, and to capture and store (e.g., on storage device 206) various data associated therewith, e.g., incoming physical layer data. Such physical layer data may include, for example, channel state information (CSI) of STA 102.

In some embodiments, signal analysis module 206b may be configured to process and analyze the signal captured by signal capture module 206a, to extract a variety of RF parameters and features, which may include, but are not limited to, CFD/CFO parameters, phase parameters, frequency parameters, and/or amplitude parameters. For example, signal analysis module 206b receives network traffic data originating from STA 102. Signal analysis module 206b parses the data to extract the relevant RF features therefrom.

In some embodiments, the extracted RF features are provided from signal analysis module 206b to fingerprint generator 206c for use in generating a global RF fingerprint 222 for STA 102, which may be used by any network node in LAN 108. In some embodiments, system 200 may be configured to output the generated global RF fingerprint 222, e.g., by transmitting it to one or more other nodes within a network. In some embodiments, system 200 may be further configured to store generated fingerprints in a repository of RF fingerprints stored, e.g., on storage device 206.

System 200 as described herein is only an exemplary embodiment of the present invention, and in practice may be implemented in hardware only, software only, or a combination of both hardware and software. System 200 may have more or fewer components and modules than shown, may combine two or more of the components, or may have a different configuration or arrangement of the components. System 200 may include any additional component enabling it to function as an operable computer system, such as a motherboard, data busses, power supply, a network interface card, a display, an input device (e.g., keyboard, pointing device, touch-sensitive display), etc. (not shown).

The instructions of system 200 will now be discussed, with continuous reference to FIG. 2, with reference to the flowchart of FIG. 3, which illustrates the functional steps in a method 300 for generating a client-device radiofrequency (RF) fingerprint in conjunction with a transceiver node within a communication network, e.g., LAN 108 shown in FIGS. 1A-1B, wherein the generated RF fingerprint may then be adapted for global use by any other node within the communication network, to identify and authenticate the client device, according to some embodiments of the present disclosure.

Method 300 begins in step 302, wherein the instructions of RF transceiver 208 may cause system 200, operating as a first network node, e.g. network node 106a within LAN 108 shown in FIGS. 1A-1B, to receive an RF data signal 220 (shown in FIG. 2). The received RF signal carries network data traffic associated with a client device, e.g., STA 102 shown in FIGS. 1A-1B. In some embodiments, the received RF data signal may be captured and stored by signal capture module 206a.

In some embodiments, in step 304, the instructions of signal analysis module 206b may cause system 200 to process and analyze a variety of RF parameters and features with respect to the signal 220 captured by signal capture module 206a in step 302. Such RF parameters and features may include, but are not limited to, carrier frequency difference (CFD) or carrier frequency offset (CFO) features, phase-related features, frequency-related features, and/or amplitude-related features.

The following discussion will focus, by way of a non-limiting example only, on extracting CFO features from the captured data, and using the CFO features to construct RF fingerprints. However, other and/or additional analysis methodologies may be employed in the context of the present disclosure to recover additional PHY layer and other RF features, in addition to, or in lieu of, CFO, which may be useful in conjunction with no-BLE transmission protocols, e.g., Wi-Fi.

Figure 3:
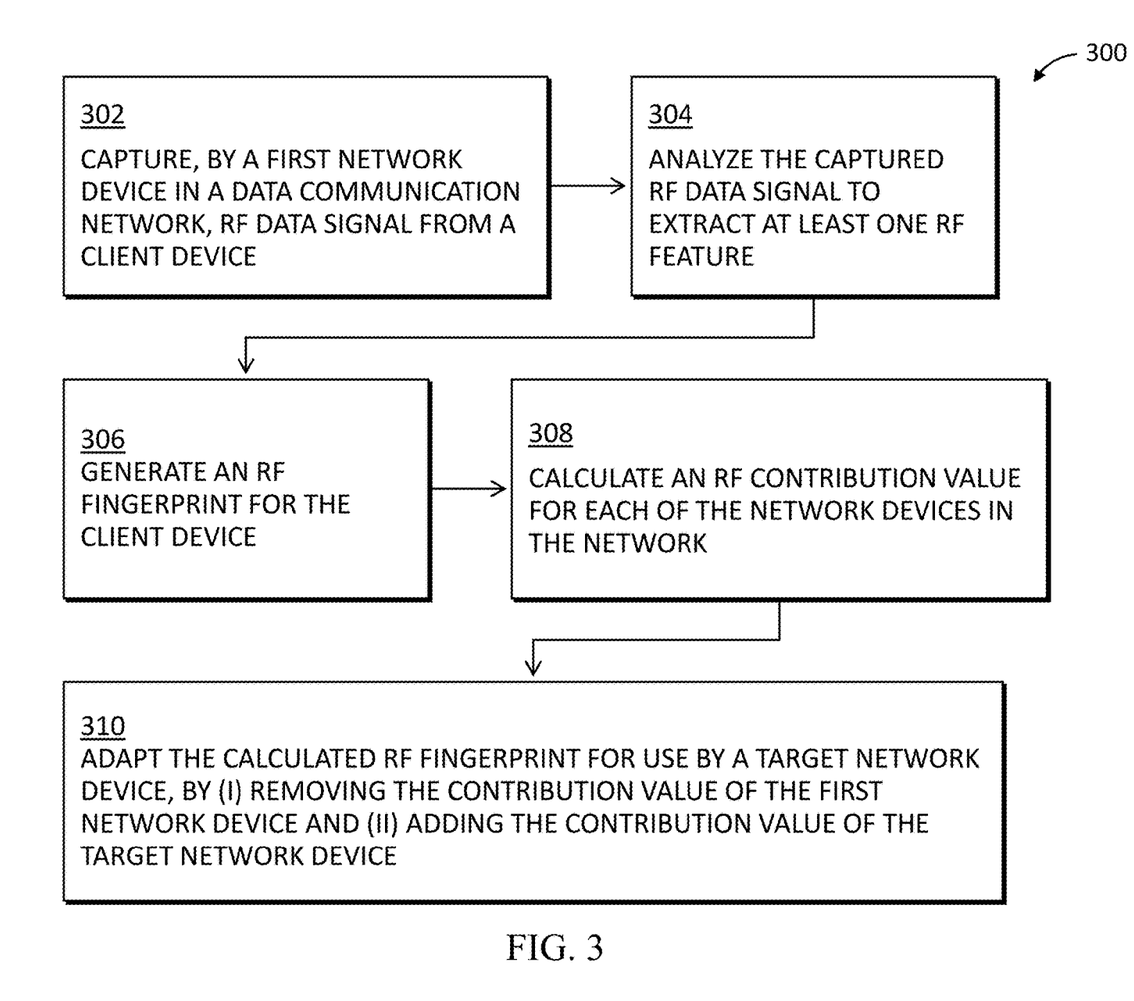
FIG. 3 illustrates the functional steps in a method for generating a client-device radiofrequency (RF) fingerprint in conjunction with a transceiver node within a communication network, wherein the generated RF fingerprint may then be adapted for global use by any other node within the communication network, to identify and authenticate the client device, according to some embodiments of the present disclosure.
Figure 4:
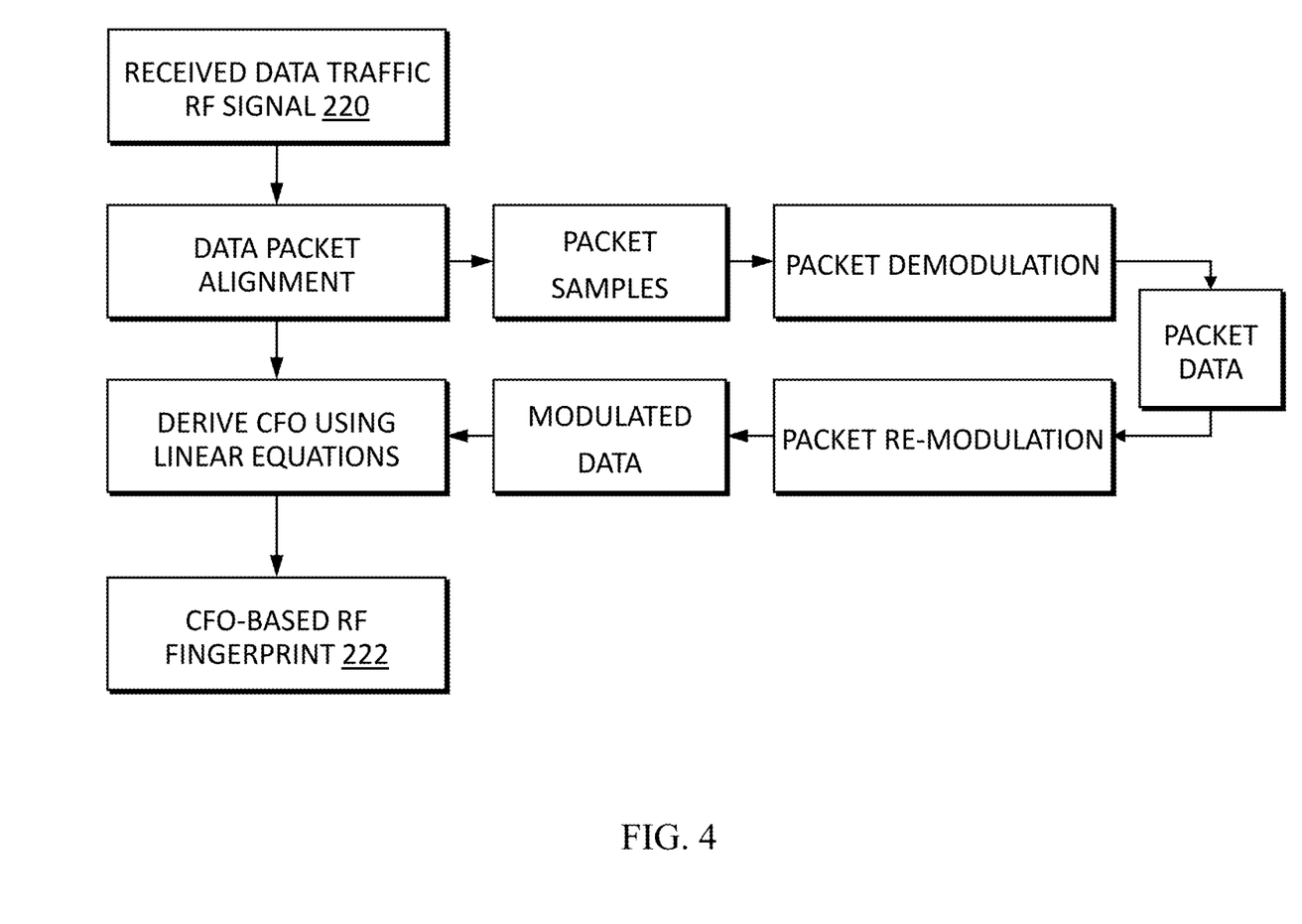
FIG. 4 is a flowchart illustrating the various steps comprising the analysis process to estimate CFO values of a client device based on an RF data signal emitted from the client device, according to some embodiments of the present disclosure.

Reference is now made to FIG. 4 which illustrates an exemplary analysis sequence which may be employed in step 304 in FIG. 3, to estimate CFO values of a client device (such as STA 102 in FIGS. 1A-1B) based on an RF data signal (e.g., 220 in FIG. 2) emitted from the client device.

As noted above, CFO and/or modulation index are a common anomaly in transmitting devices, which often occur when a local oscillator signal in the receiver does not synchronize with the carrier signal contained in the received signal. As a result, the received signal may be shifted in frequency. This phenomenon can be attributed to several factors, chief of which is clock drift in the transmitting device. Clock drift is a phenomenon caused by manufacturing variability of oscillators. To keep manufacturing costs low, typically a range of 7.5-100 ppm is assumed for commonplace wireless devices, such as consumer Bluetooth devices. This means that, for RF transmission in the 2.4 GHz band, CFO may be in the range of 18 kHz to 240 kHz.

Because CFO and modulation index are a device-specific trait, they may be exploited for use in device fingerprinting authentication. Specifically, the frequency mismatch in the transmitter and the receiver oscillators can be measured and used in constructing a device RF fingerprint. Accordingly, in some embodiments, the present invention provides for one or more algorithms for calculating an estimated CFO value and/or modulation index for an RF device, based on at least one digital data packet received from the device. The estimated CFO value and/or modulation index calculated for the RF device may then be used, alone or with other elements, in constructing a more accurate RF fingerprint for identification and authentication of the device.

Accordingly, in some embodiments, the instructions of signal analysis module 206b may cause system 200 to process the captured RF data signal 220, to perform packet alignment with respect to one or more received data packets comprising RF data signal 220, so as to be able to determine the starting point of each data bit in the packet. In some embodiments, packet bit alignment may be performed by sampling the RF signal which comprises the input RF data signal 220 at an appropriate oversampling rate, to identify local phase maximums:

$$M=\{l_1, \ldots, l_k : \theta_{l_i} > \theta_{l_i-1} \wedge \theta_{l_i} > \theta_{l_i+1}, \theta_{l_i-1} > \theta_{l_i-2} \wedge \theta_{l_i+1} > \theta_{l_i+2}\},$$

where the packet local phases are denoted $\theta_1, \ldots, \theta_T$.

The packet may be considered to be correctly aligned once the function $$\{l_i \% \text{ oversample rate}: l_i \in M\}$$

results in a string of zeros (however, small exceptions may occur due to noisy samples). The alignment process may be concluded by removing k samples from the beginning of the packet, where $$k=\text{median}(\{l_i \% \text{ oversample rate}: l_i \in M\}).$$

In some embodiments, once the one or more data packets are properly aligned, the instructions of signal analysis module 206b may cause system 200 to demodulate the data bits in a sample of one or more aligned data packets, to derive the underlying raw data carried by the RF data signal 220. In some embodiments, this step is performed by examining the phase of the modulation samples $\theta_{i*k+1}, \ldots, \theta_{i*(k+1)}$ corresponding to each data bit $X_1, \ldots, X_n$ (n=T/oversample rate), where k is the number of samples obtained per bit.

In some embodiments, each data bit may be demodulated by determining the sign (i.e., positive or negative) of the derivative of the phase of the bit, where a positive phase corresponds to a logical '1' and a negative phase corresponds to a logical '0'. Accordingly, the bit may be expressed as:

$$X_i = (\text{sign}(\theta_{i*(k+1)-k/4} - \theta_{i*k+1+k/4}) + 1)/2.$$

With continued reference to FIG. 4, in some embodiments, once the packet has been demodulated and the underlying data bits derived, the instructions of signal analysis module 206b may cause system 200 to re-modulate the data to create a theoretical perfect GFSK waveform, by using GFSK modulation with the known parameters defined in the relevant transmission protocol (e.g., BLE). The modulated data $G_1, \ldots, G_T$ may then be used to get a set of linear equations derived from each phase sample:

$$\theta_i = \frac{2\pi i}{\text{sampling frequency}} * CFO + G_i * h + \theta_1 + \varepsilon_i,$$

where h is an unknown modulation index, CFO is the unknown carrier frequency offset, and $\varepsilon_i$ is the noise for sample i. Both CFO and h may then be estimated by solving the linear equations using a least squares method.

In some embodiments, the present invention provides for an 'embedded' version of a CFO estimation algorithm, intended for use in the context of mobile devices, and configured for reducing computational overhead of the estimation algorithm. In some embodiments, an embedded version of a CFO estimation algorithm of the present disclosure may be configured to carry out the steps of packet alignment, packet demodulating and decoding, and data re-modulation, as described above with reference to FIG. 4. However, in some embodiments, in order to optimize running time, the linear equations step may provide for subtracting equation pairs. Accordingly, in some embodiments, the linear equations may be expressed as:

$$\theta_{i+j} - \theta_i = \frac{2\pi j}{\text{sampling frequency}} * CFO + (G_{i+j} - G_i) * h + \varepsilon_{i+j} - \varepsilon_i$$

This way, there may be obtained a set of equations with only one explanatory variable h (modulation index), and an intercept which may be solved more efficiently than the original equations. The new linear equations may be denoted $$\theta_i^* = \alpha + G_i^{**} h + \varepsilon_i^*,$$

where:

$$\theta_i^* = \theta_{i+j}^* - \theta_i^*,$$

$$\alpha = \frac{2\pi j}{\text{sampling frequency}} * CFO,$$

$$G_i^* = G_{i+j} - G_i, \text{ and}$$

$$\varepsilon_i^* = \varepsilon_{i+j} - \varepsilon_i.$$

Based on the above, there can be obtained the modulation index h by:

$$h = \frac{\text{Cov}(G^*, \theta^*)}{\text{Var}(G^*)}, \text{ and}$$

$$\alpha = \text{mean}(\theta^*) - \frac{\text{Cov}(G^*, \theta^*)}{\text{Var}(G^*)} * \text{mean}(G^*),$$

from which there can be derived the CFO value:

$$CFO = \alpha * \frac{\text{sampling frequency}}{2\pi j}.$$

In this example, j was selected as 4*oversample rate. Note that by choosing a larger j, the total number of equations may decrease, while a smaller j may lead to correlations between the noise in different equations.

In yet other embodiments, a constant data variation of the CFO estimation algorithm described above may be employed by the present disclosure. In the constant data variation, the instructions of signal analysis module 206b may cause system 200 to calculate separately the CFO value for '1' and '0' bits in the received digital data packet. In this variation, the packet alignment and packet decoding stages are performed as described above. Then, the instructions of signal analysis module 206b may cause system 200 to obtain data segments having each a minimum-length sequence of identical decoded data bits (i.e., 0 or 1, respectively). These segments may be acquired as follows:

$$X_1 = \{(x_i, x_{i+1}, \ldots, x_{i+l}) : x_i = x_{i+1} = \ldots = x_{i+l} = 1 \wedge l > 4\}$$

$$X_0 = \{(x_i, x_{i+1}, \ldots, x_{i+l}) : x_i = x_{i+1} = \ldots = x_{i+l} = 0 \wedge l > 4\}$$

where l is the minimum length for consecutive identical bits.

For every acquired segment $(x_i, x_{i+i}, \ldots, x_{i+l})$, the corresponding phase samples $(\theta_{i*k+1}, \ldots, \theta_{(i+l+1)*k})$ may be considered, where k is the oversample rate. In some embodiments, two samples are removed from the edges of each phase segment, in order to cancel the modulation gaussian filter effect, to get the segments:

$$G_1 = \{(\theta_{i*k+3}, \theta_{i*k+4}, \ldots, \theta_{(i+l+1)*k-2}) : x_i = x_{i+1} = \ldots = x_{i+l} = 1 \land l > 4\}$$

$$G_0 = \{(\theta_{i*k+3}, \theta_{i*k+4}, \ldots, \theta_{(i+l+1)*k-2}) : x_i = x_{i+1} = \ldots = x_{i+l} = 0 \land l > 4\}.$$

Then, for every segment in $G_1$, $G_0$ there is assumed a constant CFO value, which may be found by solving the equations set:

$$\{\theta_{s+j} = j*CFO + \theta_s : 1 \leq j \leq m\},$$

where $\theta_s$ is the first segment phase sample and m is the segment length. In some embodiments, these equations may be solved by using the linear equations solving method described above with reference to the embedded version of the CFO estimation algorithm.

Given the calculated CFO for all segments, the RF device CFO values corresponding, respectively, to 1 data bits and to 0 data bits, may then be calculated in the following way:

$$F_1 = \frac{\sum_{i=1}^{t} f_i * m_i}{\sum_{i=1}^{t} m_i}, \quad F_0 = \frac{\sum_{i=1}^{r} g_i * l_i}{\sum_{i=1}^{r} l_i},$$

where:
t is the number of segments in $G_1$;
r is the number of segments in $G_0$;
$f_1, \ldots, f_t$ are the frequencies corresponding to the segments in $f_1$;
$g_1, \ldots, g_r$ are the frequencies corresponding to the segments in $G_0$;
$m_1, \ldots, m_t$ are the length of the segments in $G_1$; and
$l_1, \ldots, l_r$ are the lengths of the segments in $G_0$.

The RF device total CFO may then be derived as the average of $F_0$ and $F_1$.

With reference back to step 304 in FIG. 3, as noted above, in some embodiments, the present disclosure may use additional and/or other method to collect, process and analyze a variety of RF parameters and features by signal capture module 206a in step 302. Such RF parameters and features may be based, e.g., on CSI data which may encapsulate the physical properties of a communication channel between a transmitting device (e.g., STA 102 shown in FIGS. 1A-1B) and a network node. In some embodiments, such CSI data may be accessed via a proprietary software patch that may be applied to Wi-Fi communication cards, or via Application Programming Interfaces (APIs) that may be provided by Wi-Fi silicon providers.

In other cases, the present disclosure may use standard 802.11 beamforming protocol data frames or packets as a data source for RF fingerprinting of wireless communication devices. Beamforming protocol data frames may include data elements that are derived from or correlate to physical layer data, and may be accessed by monitoring transmissions over a relevant wireless channel as part of a standard beamforming protocol.

Accordingly, in some embodiments, the present disclosure may employ a method of RF fingerprinting by monitoring beamforming protocol data frames or packets (e.g., "compressed beamforming action frames"), as defined by the 802.11 wireless protocol, over a wireless channel between a wireless AP and a wireless receiving device. In some embodiments, the present disclosure may extract one or more features from the monitored beamforming protocol data frames, which may include angle parameters, and calculate steering data based on the extracted angle parameters. In some embodiments, the steering data may represent a specific subcarrier of the wireless channel, a specific antenna of the AP, and/or a specific antenna of the receiving device. In some embodiments, the extracted features may be used to calculate a channel-invariant RF fingerprint of the transmitting device.

With reference back to FIG. 3, in step 306, the instructions of fingerprint generator 206c may cause system 200 to use the RF features extracted by signal analysis module 206b in step 304 (as a non-limiting example, CFO features), to construct an RF fingerprint $FP_{tx-rx_i}$ for the client device (e.g., STA 102 in FIGS. 1A-1B), wherein the constructed RF fingerprint is specific to the particular network receiving device $rx_i$ (e.g., network node 106a shown in FIGS. 1A-1B) used for receiving the RF data signal 220 from STA 102.

In step 308, the instructions of fingerprint generator 206c may cause system 200 to perform a calibration step with respect to multiple receiving devices in a network of interest (e.g., network nodes 106b-106d in LAN 108 shown in FIGS. 1A-1B), wherein system 200 may learn a series of RF fingerprint conversion values which may be used to convert an RF fingerprint $FP_{tx-rx_i}$ calculated in step 306 for a specific combination client device-network node (e.g., STA 102 and node 106a in FIGS. 1A-1B) that is specific to a first network receiving device $rx_i$, for use with one or more other receiving devices in the network, e.g., any of network nodes 106b-106d (denoted {$rx_1, rx_2 \ldots rx_j$}).

In some embodiments, the RF fingerprint conversion values with respect to each pair of network receiving devices may be learned based, at least in part, on reciprocal transmitting and receiving of RF data signals directly among pairs of the network receiving devices, or between a central hub and each network receiving device. Thus, at the conclusion of this calculation, system 200 may store a set of RF fingerprint conversion values for each pair of network receiving devices within the network. In some embodiments, the calculations in step 308 may be performed using the methodology outlined in steps 304 and 306.

Figure 5A:
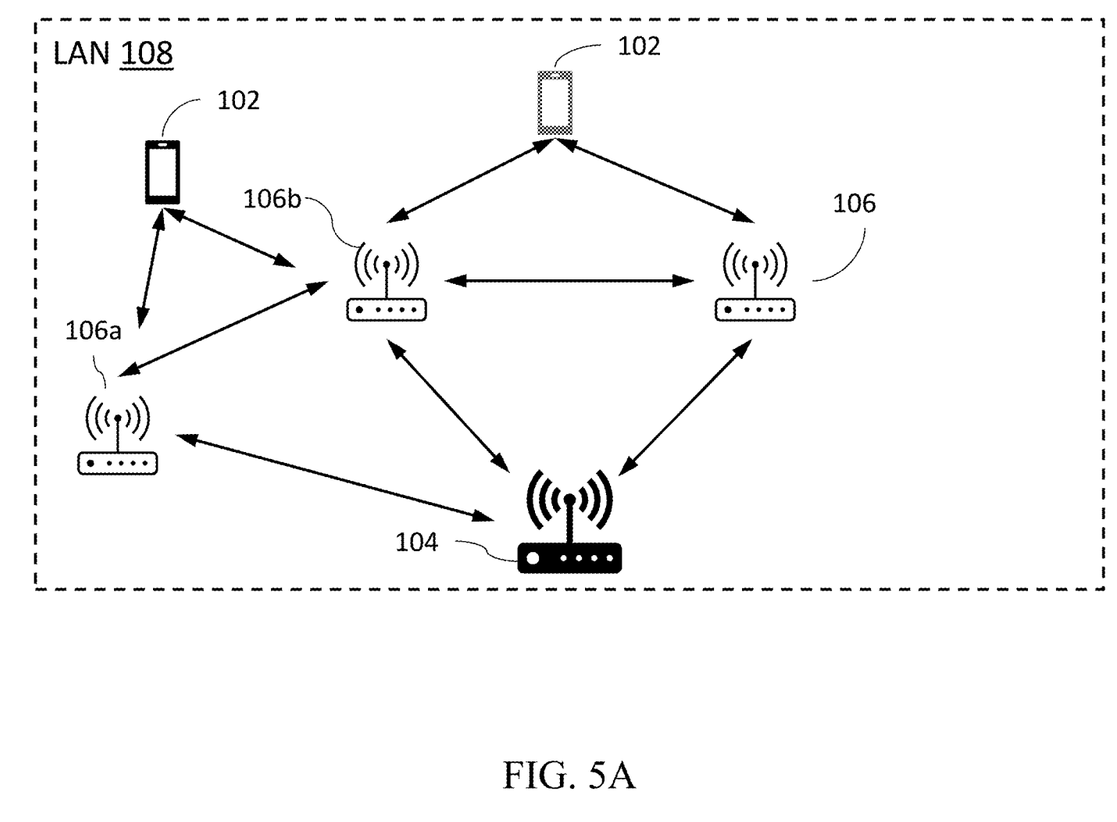
FIGS. 5A-5B depict different techniques for performing a calibration step with respect to each, or at least some of, the network nodes in the present network, according to some embodiments of the present disclosure.
Figure 5B:
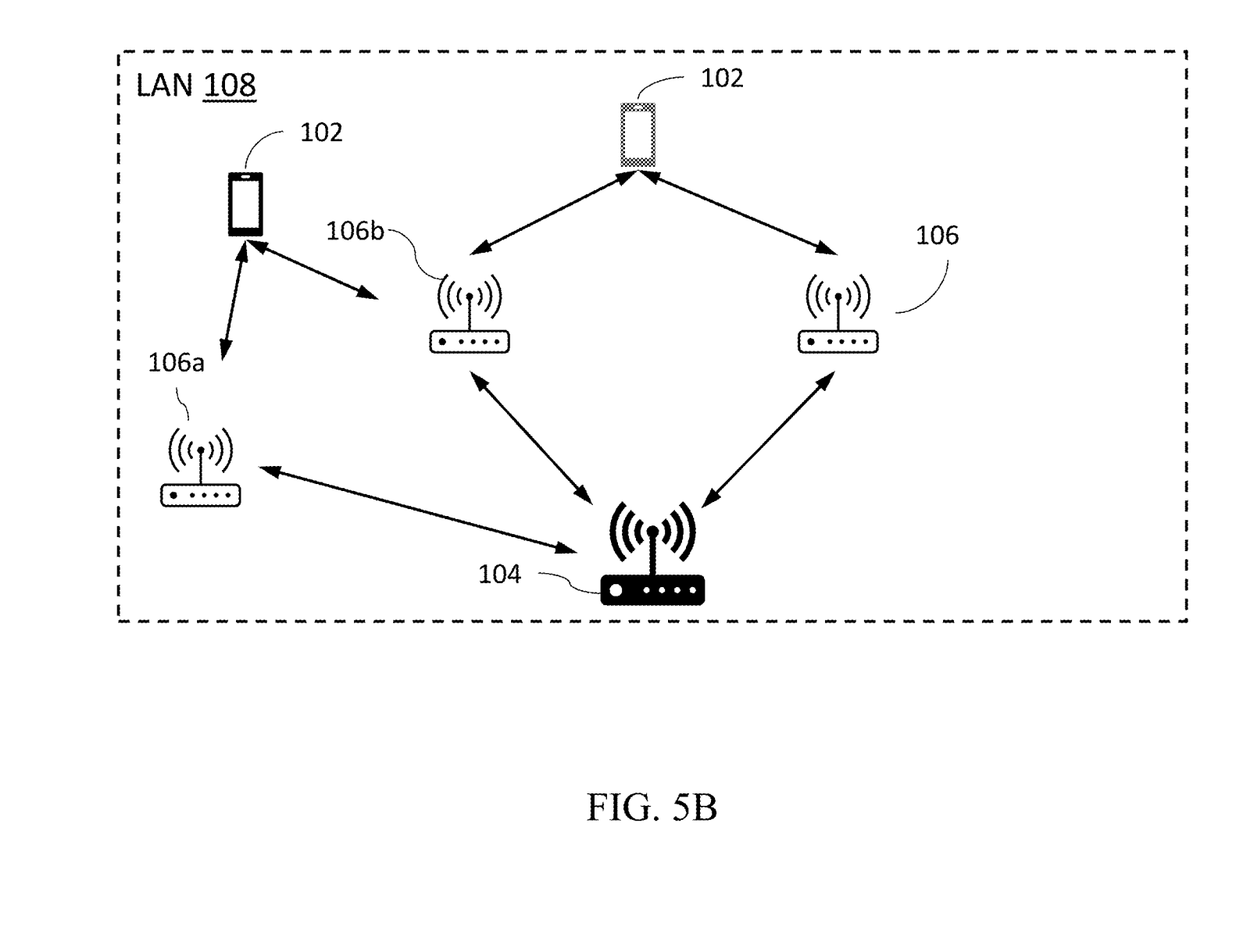

Reference is made to FIGS. 5A-5B which depict different techniques for performing calibration step 308 with, wherein system 200 may learn an RF fingerprint conversion values with respect to each pair of network receiving devices selected from {$rx_1, rx_2 \ldots rx_j$}.

In some embodiments, step 308 may comprise learning, by each network receiving device {$rx_1, rx_2 \ldots rx_j$}, a CFO value with respect to each of the other network receiving devices {$rx_1, rx_2 \ldots rx_j$}. In such case, RF fingerprint conversion values may be estimated between each unique pair of network receiving devices, e.g., $rx_1/rx_2$, $rx_2/rx_3$, $rx_1/rx_3$ etc., based on the relative CFO values measured by the pair with respect to one another. In some embodiments, the measured relative CFO values may be stored by system 200, e.g., on storage device 206.

In the case depicted in FIG. 5A, a unique pair of receiving devices (e.g., 106a/106b or 106b/106c) may be configured for communicating directly with one another. In such case, each of the pair of receiving devices $rx_1/rx_2$ (e.g., 106a/106b) may perform a CFO estimation of the other receiving device in the pair, wherein the CFO estimation includes a contribution component of the receiving device performing the estimation. Accordingly, an RF fingerprint conversion value between a unique pair of receiving devices $rx_1/rx_2$ (e.g., 106a/106b) may be calculated as a differential between (i) a CFO value of receiving device $rx_1$ as measured by receiving device $rx_2$, and (ii) a CFO value of receiving device $rx_2$ as measured by receiving device $rx_1$. The respective estimated CFO values of each receiving device may be estimated by each network receiving device $\{rx_1, rx_2 \ldots rx_i\}$ for each other network receiving device $\{rx_1, rx_2 \ldots rx_i\}$ using the methodology outlined in step 304 above. These unique CFO value pairs and the conversion values may then be communicated to and stored by system 200, e.g., on storage device 206.

Thus, for example, as detailed in step 306 above, system 200 may construct and store an RF fingerprint $FP_{tx-rx_i}$ for a client device (e.g., STA 102 in FIG. 5A), in conjunction with the particular network receiving device $rx_1$ (e.g., network node 106a in FIG. 5A). Network receiving device $rx_1$ (node 106a) may in turn estimate and store CFO values of each of the other receiving devices $\{rx_2 \ldots rx_i\}$ (e.g., nodes 106b-106d). Similarly, each of the other receiving devices $\{rx_2 \ldots rx_i\}$ (nodes 106b-106d) may estimate and store a CFO value of receiving device $rx_1$ (node 106a). These CFO values may then be communicated to and stored by system 200, e.g., on storage device 206, and used to convert the RF fingerprint $FP_{tx-rx_1}$ for the client device for use by the any other one of receiving devices $\{rx_2 \ldots rx_i\}$ (e.g., nodes 106b-106d).

Alternatively, in the case depicted in FIG. 5B, a unique pair of receiving devices (e.g., 106a/106b or 106b/106c) may be configured for communicating through a central hub, e.g., AP 104. In such case, the conversion value with respect to a pair of receiving devices $rx_1/rx_2$ (e.g., nodes 106a/106b) may be based on a CFO differential calculated by the central hub AP 104 with respect to the unique pair of network receiving devices. Accordingly, a conversion value between a unique pair of receiving devices $rx_1/rx_2$ (e.g., nodes 106a/106b) may be calculated as a differential between (i) a CFO value of receiving device $rx_1$ (node 106a) as measured by central hub AP 104, and (ii) a CFO value of receiving device $rx_2$ (node 106b) as measured by central hub AP 104. The respective estimated CFO values of each receiving device may be estimated by central hub AP 104 using the methodology outlined in step 304 above. These CFO values may then be communicated to and stored by system 200, e.g., on storage device 206.

Thus, for example, as detailed in step 306 above, system 200 may construct and store an RF fingerprint $FP_{tx-rx_i}$ for a client device (e.g., STA 102 in FIG. 5B), in conjunction with the particular network receiving device $rx_1$ (e.g., network node 106a in FIG. 5B). Central hub AP 104 may in turn estimate CFO values of each of the receiving devices $\{rx_1 \ldots rx_i\}$ (e.g., nodes 106b-106d). These CFO values may then be communicated to and stored by system 200, e.g., on storage device 206, and used to convert the RF fingerprint $FP_{tx-rx_1}$ for the client device for use by the any other one of receiving devices $\{rx_2 \ldots rx_i\}$ (e.g., nodes 106b-106d).

Alternatively, in some embodiments, the present disclosure provides for calculating a polynomial which represents a conversion value between each pair of receiving devices in a network.

By way of background, CFO estimations (as detailed above with reference to step 304) may be affected by operational and/or ambient parameters associated with the transmitting device (e.g., in the present case, STA 102) as well as the hardware idiosyncrasies (e.g., specific chipset) and operational and/or ambient parameters associated with the receiving device (in the present case, any one of network nodes 106a-106d shown in FIGS. 1A-1B).

For example, operational parameters of the transmitting device may include, but are not limited to, wireless connectivity state (on/off) of various transceivers (e.g., Bluetooth, Wi-Fi) within the device; the particular network communication channel used in the transmission; and device operating temperatures collected from a plurality of sensors, including, but not limited to, CPU, GPU, and battery temperature. For example, operational parameters of the receiving device may include, but are not limited to, device operating temperatures collected from a plurality of sensors in the receiving device. In some embodiments, ambient parameters may include, e.g., ambient temperature and ambient relative humidity.

Accordingly, in some embodiments, the present disclosure provides for taking into account operating temperatures of the transmitting as well as the receiving devices in calculating a conversion value between a pair of receiving devices, to the extent measurable and available.

Thus, in some embodiments, an RF fingerprint $F_{tx-rx_i}$ with respect to a of transmitter device tx calculated in conjunction with a particular network receiving device $rx_i$, may be modeled by the following polynomial equation which takes into account the respective operational temperatures $T_{tx}$ of the transmitter device tx and $T_{rx_i}$ of the network receiving device $rx_i$:

$$F_{tx-rx_i} = b_{0-tx-rx_i} + b_{1-rx_i}T_{rx_i} + b_{2-rx_i}T_{rx_i}^2 + b_{1-tx}T_{tx}b_{2-tx}T_{tx}^2$$

Where $rx_i$ is a particular receiver device from a set of receiver devices, $rx_i \in \{rx_1, rx_2 \ldots rx_i\}$.

In some embodiments, a contribution value $F_{rx_i}$ may be calculated for each network receiving device within the network, e.g., $\{F_{rx_1}, F_{rx_2} \ldots F_{rx_i}\}$, which represents the receiving device's contribution to the calculated RF fingerprint $FP_{tx-rx_i}$, which may be modeled as:

$$F_{rx_i} = b_{0-rx_i} + b_{1-rx_i}T_{rx_i} + b_{2-rx_i}T_{rx_i}^2$$

where $rx_i$ is a particular receiver device from a set of receiver devices, $rx_i \in \{rx_1, rx_2 \ldots rx_i\}$.

In some embodiments, step 308 comprises calculating this contribution value for each network receiving device, $\{F_{rx_1}, F_{rx_2} \ldots F_{rx_i}\}$. Thus, at the conclusion of this calculation, system 200 may store a set of RF fingerprint contribution values for each network receiving device within the network, e.g., $\{F_{rx_1}, F_{rx_2} \ldots F_{rx_i}\}$.

Accordingly, in some embodiments, calculating a conversion value from a first receiving device $rx_1$ to a second receiving device $rx_2$ may be determined as:

$$F_{tx-rx2} = F_{tx-rx1} - F_{rx1} + F_{rx2}.$$

wherein the conversion is based on identifying and removing from calculated RF fingerprint RF $F_{tx-rx_1}$ the contribution value which may be attributed to the first network receiving device $rx_1$, and adding the contribution value $F_{rx_2}$ of a desired target receiving device $rx_2$.

Alternatively, in some embodiments, the present disclosure provides for calculating a transformation function between each respective pair of receiving devices within a network. In some embodiments, this transformation function may be learned by a third network device that has transmitted data transmitted which has been received by both device in the pair. In some embodiments, such transformation functions may be modeled as:

$$f(F_{rx_1}, rx_1, rx_2): F_{rx_1} \to F_{rx_2}.$$

In some embodiments, in step 310, the instructions of fingerprint generator 206c may cause system 200 to perform a conversion of an RF fingerprint $F_{tx-rx_i}$ constructed with respect to a transmitter $tx_1$ by a first receiving device $rx_1$, to convert it for use by another one of the network receiving devices, e.g., a second receiving device $rx_2$. In some embodiments, such conversion may be performed by (i) taking the RF fingerprint of transmitter $tx_1$, $F_{tx-rx_1}$, and (ii) applying thereto a conversion value calculated and stored by system 200 in step 308 with respect to the pair $rx_1/rx_2$. For example, this conversion value may be a CFO value differential calculated between $rx_1/rx_2$, e.g., using direct or indirect communication as detailed above in step 308.

In other examples, the conversion may be performed by identifying and removing from calculated RF fingerprint the $F_{tx-rx_1}$, the contribution value which may be attributed to the first network receiving device $rx_1$, and adding the contribution value of a desired target receiving device $rx_2$, e.g.:

$$F_{rx_2} = b_{0-rx_2} + b_{1-rx_2} T_{rx_2} + b_{2-rx_2} T_{rx_2}^2$$

In yet other examples, the conversion may be performed by applying to the calculated RF fingerprint the $FP_{tx-rx_i}$ a transformation function from $rx_1$ to $rx_2$, e.g.:

$$f(FP_{rx_1}, rx_1, rx_2) : FP_{rx_1 \to FPrx_2}.$$

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:
    at least one hardware processor; and
    a non-transitory computer-readable storage medium having stored thereon program instructions, the program instructions executable by the at least one hardware processor to:
        receive, by a first radio frequency (RF) receiving device, an RF data transmission from an RF transmitter,
        analyze the received RF data transmission to estimate at least one RF feature,
        construct, based on said at least one RF feature, an RF fingerprint of said RF transmitter which is specific to said first RF receiving device, and
        modify said RF fingerprint to generate a modified RF fingerprint for use by a second RF receiving device, by applying, to said RF fingerprint, a conversion function reflecting a differential between respective contribution values associated with each of said first and second receiving devices.

2. The system of claim 1, wherein said RF fingerprint is used by said first receiving device, and said modified RF fingerprint is used by said second receiving device, to perform at least one of: identifying said RF transmitter and authenticating a transmission received from said RF transmitter.

3. The system of claim 1, wherein said at least one RF feature is a carrier frequency offset (CFO) value associated with said RF transmitter.

4. The system of claim 1, wherein said contribution value associated with said first and second receiving devices represent a change in said RF feature resulting from one or more of: operational parameters, ambient parameters, and hardware parameters, associated with said first or second receiving device, respectively.

5. The system of claim 4, wherein said operational parameters and ambient parameters include at least one of: device operating temperature, connectivity state of one or more transceivers within the device, signal-to-noise ratio, channel bandwidth, a network communication channel used in transmission, ambient temperature, and ambient relative humidity.

6. The system of claim 1, wherein said contribution values are calculated by each of said first and second receiving devices, respectively with respect to one another.

7. The system of claim 1, wherein said contribution values are calculated by a third network device with respect to each of said first and second receiving devices.

8. A computer-implemented method comprising:
    receiving, by a first radio frequency (RF) receiving device, an RF data transmission from an RF transmitter;
    analyzing the received RF data transmission to estimate at least one RF feature;
    constructing, based on said at least one RF feature, an RF fingerprint of said RF transmitter which is specific to said first RF receiving device; and
    modifying said RF fingerprint to generate a modified RF fingerprint for use by a second RF receiving device, by applying, to said RF fingerprint, a conversion function reflecting a differential between respective contribution values associated with each of said first and second receiving devices.

9. The computer-implemented method of claim 8, wherein said RF fingerprint is used by said first receiving device, and said modified RF fingerprint is used by said second receiving device, to perform at least one of: identifying said RF transmitter and authenticating a transmission received from said RF transmitter.

10. The computer-implemented method of claim 8, wherein said at least one RF feature is a carrier frequency offset (CFO) value associated with said RF transmitter.

11. The computer-implemented method of claim 8, wherein said contribution value associated with said first and second receiving devices represent a change in said RF feature resulting from one or more of: operational parameters, ambient parameters, and hardware parameters, associated with said first or second receiving device, respectively.

12. The computer-implemented method of claim 11, wherein said operational parameters and ambient parameters include at least one of: device operating temperature, connectivity state of one or more transceivers within the device, signal-to-noise ratio, channel bandwidth, a network communication channel used in transmission, ambient temperature, and ambient relative humidity.

13. The computer-implemented method of claim 8, wherein said contribution values are calculated by each of said first and second receiving devices, respectively with respect to one another.

14. The computer-implemented method of claim 8, wherein said contribution values are calculated by a third network device with respect to each of said first and second receiving devices.

15. A computer program product comprising a non-transitory computer-readable storage medium having program instructions embodied therewith, the program instructions executable by at least one hardware processor to:
   receive, by a first radio frequency (RF) receiving device, an RF data transmission from an RF transmitter;
   analyze the received RF data transmission to estimate at least one RF feature;
   construct, based on said at least one RF feature, an RF fingerprint of said RF transmitter which is specific to said first RF receiving device; and
   modify said RF fingerprint to generate a modified RF fingerprint for use by a second RF receiving device, by applying, to said RF fingerprint, a conversion function reflecting a differential between respective contribution values associated with each of said first and second receiving devices.

16. The computer program product of claim 15, wherein said RF fingerprint is used by said first receiving device, and said modified RF fingerprint is used by said second receiving device, to perform at least one of: identifying said RF transmitter and authenticating a transmission received from said RF transmitter.

17. The computer program product of claim 15, wherein said at least one RF feature is a carrier frequency offset (CFO) value associated with said RF transmitter.

18. The computer program product of claim 15, wherein said contribution value associated with said first and second receiving devices represent a change in said RF feature resulting from one or more of: operational parameters, ambient parameters, and hardware parameters, associated with said first or second receiving device, respectively.

19. The computer program product of claim 18, wherein said operational parameters and ambient parameters include at least one of: device operating temperature, connectivity state of one or more transceivers within the device, signal-to-noise ratio, channel bandwidth, a network communication channel used in transmission, ambient temperature, and ambient relative humidity.

20. The computer program product of claim 15, wherein said contribution values are (i) calculated by each of said first and second receiving devices, respectively with respect to one another, or (ii) calculated by a third network device with respect to each of said first and second receiving devices.

* * * * *